US011486512B2

(12) United States Patent
Takeda et al.

(10) Patent No.: US 11,486,512 B2
(45) Date of Patent: Nov. 1, 2022

(54) OPENING AND CLOSING HANDLE, AND VALVE DEVICE

(71) Applicant: NERIKI VALVE CO., LTD., Hyogo (JP)

(72) Inventors: Masaru Takeda, Hyogo (JP); Kazuyuki Miyata, Hyogo (JP)

(73) Assignee: NERIKI VALVE CO., LTD., Hyogo (JP)

( * ) Notice: Subject to any disclaimer, the term of this patent is extended or adjusted under 35 U.S.C. 154(b) by 41 days.

(21) Appl. No.: 17/016,465

(22) Filed: Sep. 10, 2020

(65) Prior Publication Data

US 2020/0408330 A1    Dec. 31, 2020

Related U.S. Application Data

(63) Continuation of application No. PCT/JP2019/009649, filed on Mar. 11, 2019.

(30) Foreign Application Priority Data

Mar. 12, 2018 (JP) .............................. JP2018-044671

(51) Int. Cl.
*F16K 31/60*    (2006.01)
*F16K 31/53*    (2006.01)
*F16K 37/00*    (2006.01)

(52) U.S. Cl.
CPC ............ *F16K 31/60* (2013.01); *F16K 31/535* (2013.01); *F16K 37/0008* (2013.01); *F16K 37/0058* (2013.01)

(58) Field of Classification Search
CPC .... F16K 31/60; F16K 31/535; F16K 37/0008; F16K 37/0058
See application file for complete search history.

(56) References Cited

U.S. PATENT DOCUMENTS 824,163 A  *  6/1906  Whitney  .............  F16K 37/0008
                                                              116/277
4,133,288 A *  1/1979  Burgess   .............. F16K 37/0008
                                                              116/271
(Continued)

FOREIGN PATENT DOCUMENTS

DE       3902731 A1    8/1989
EP       0092714 A1    11/1983
(Continued)

OTHER PUBLICATIONS

International Search Report issued in PCT/JP2019/009649 dated Apr. 2, 2019 with English Translation (5 pages).
(Continued)

*Primary Examiner* — Angelisa L. Hicks
(74) *Attorney, Agent, or Firm* — Nakanishi IP Associates, LLC

(57) ABSTRACT

An open/closed display handle for rotating a spindle of an open/closed valve mechanism of a valve device includes a handle main body having a handle-side gear that rotates about an axis of the spindle, a rotary display body having an open/closed display portion that displays an open/closed valve state and a display body-side gear, and a rotary fixed body that pivotally supports planetary gears. The planetary gears, the handle-side gear, and the display body-side gear form a differential rotation mechanism, and a visual recognition restricting body that covers the rotary display body and has openings that open to allow a portion to be displayed of the open/closed display portion to be visually recognized from an outside and a transparent cover body that covers an entire outer side of the visual recognition restricting body and is translucent to allow visual recognition from an outer side form the handle main body.

12 Claims, 10 Drawing Sheets

(56) References Cited

U.S. PATENT DOCUMENTS

| | | | |
|---|---|---|---|
| 4,494,566 A | | 1/1985 | Sinclair et al. |
| 5,535,698 A | * | 7/1996 | Trevisan ............. F16K 37/0008 |
| | | | 116/277 |
| 8,763,637 B2 | * | 7/2014 | Soldo ................. F16K 37/0041 |
| | | | 137/554 |
| 2002/0157713 A1 | | 10/2002 | Pimouguet |
| 2009/0071554 A1 | | 3/2009 | Beckman et al. |
| 2016/0153581 A1 | | 6/2016 | Giubertoni |

FOREIGN PATENT DOCUMENTS

| | | |
|---|---|---|
| EP | 2207987 | 7/2010 |
| JP | S58-187678 A | 11/1983 |
| JP | 2000-179743 A | 6/2000 |
| JP | 2004-324665 A | 11/2004 |
| JP | 2011-133043 A | 7/2011 |
| JP | 2012-246964 A | 12/2012 |
| WO | 02/086365 A1 | 10/2002 |
| WO | 2009/039058 A1 | 3/2009 |

OTHER PUBLICATIONS

Office Action issued in Japanese Patent Application No. 2018-044671 dated Jan. 22, 2019, with English Translation (7 pages).
Extended European Search Report issued in European Patent Application No. 19768091.1, dated Mar. 26, 2021 (8 pages).

* cited by examiner

OPENING AND CLOSING HANDLE, AND VALVE DEVICE

CROSS-REFERENCE TO RELATED APPLICATION

The present application is a continuation application of International Application No. PCT/JP2019/009649, filed Mar. 11, 2019, which claims priority to Japanese Patent Application No. 2018-044671 filed Mar. 12, 2018. The contents of these applications are incorporated herein by reference in their entirety.

TECHNICAL FIELD

The present invention relates to a valve device which is attached to a gas storage container such as a gas cylinder, a pipe, or the like, and in which a handle is rotated to open and close an open/closed valve so as to restrict gas inflow and outflow, and an opening and closing handle attached to the valve device.

BACKGROUND ART

Conventionally, a valve device is often used which is attached to a gas storage container such as a gas cylinder, and in which a handle is rotated to vertically move and open/close an open/closed valve so as to restrict inflow and outflow of a fluid such as gas or liquid (refer to Patent Literature 1).

For example, the valve device described in Patent Literature 1 includes a handle for rotating a valve rod, and an open/closed display member with which an open display or a closed display can be visually recognized from above the handle, and configures a gear transmission mechanism between the handle and the open/closed display member, and thus an open valve state and a closed valve state can be read.

However, in the case of the above-mentioned configuration, in order to visually recognize the open/closed display from above the handle, a handle main body is provided with a window portion through which an open/closed display symbol can be visually recognized, and unintended foreign matter such as dust may enter through a gap between the handle main body and the window portion.

CITATION LIST

Patent Literature

Patent Literature 1: JP 2012-246964 A

SUMMARY OF INVENTION

Technical Problem

Therefore, an object of the present invention is to provide an opening and closing handle with which an open/closed valve state can be accurately visually recognized, and with which entry of foreign matter can be prevented, and a valve device including the opening and closing handle.

Solution to Problem

The present invention relates to an opening and closing handle that rotates a valve rod of an open/closed valve of a valve device, the opening and closing handle including: a handle main body that rotates the valve rod and has a handle-side gear that rotates about a rotation center of the valve rod; a rotary display body that has a display portion that displays at least one of an open valve state and a closed valve state of the open/closed valve, and a display body-side gear that rotates about the rotation center of the valve rod; and a rotary fixed body that is rotatably fixed to the valve device and pivotally supports a rotation gear, in which the handle-side gear includes a number of teeth different from the number of teeth of the display body-side gear, the rotation gear that is pivotally supported by the rotary fixed body that is rotatably fixed to the valve device, the handle-side gear that meshes with the rotation gear, and the display body-side gear that meshes with the rotation gear form a differential rotation mechanism that differentially rotates the rotary display body with respect to the handle main body, and the handle main body is formed of a visual recognition restricting body that covers the rotary display body, has an opening that opens to allow a required portion of the display portion to be visually recognized from an outside and restricts visual recognition of a portion other than the required portion from the outside, and a translucent cover body that covers an entire outer side of the visual recognition restricting body and is translucent to allow visual recognition from at least an outer side of the opening.

The valve device may be a container valve attached to a container such as a gas cylinder or a pipe valve attached to a pipe.

The display portion that displays at least one of the open valve state and the closed valve state may be any one of an open/closed display with characters or symbols, an open/closed display with colors, an open/closed display with patterns, and an open/closed display with light and darkness, or a combination thereof.

The required portion of the display portion described above may be a part or all of the display portion that displays at least one of the open valve state and the closed valve state of the open/closed valve.

According to the present invention, it is possible to accurately visually recognize the open/closed valve state and prevent foreign matter from entering the opening and closing handle.

More specifically, as an opening and closing handle that rotates a valve rod of an open/closed valve of a valve device, the opening and closing handle includes: a handle main body that rotates the valve rod and has a handle-side gear that rotates about a rotation center of the valve rod; a rotary display body that has a display portion that displays at least one of an open valve state and a closed valve state of the open/closed valve, and a display body-side gear that rotates about the rotation center of the valve rod; and a rotary fixed body that is rotatably fixed to the valve device and pivotally supports a rotation gear, the handle-side gear includes a number of teeth different from the number of teeth of the display body-side gear, the rotation gear that is pivotally supported by the rotary fixed body that is rotatably fixed to the valve device, the handle-side gear that meshes with the rotation gear, and the display body-side gear that meshes with the rotation gear form a differential rotation mechanism that differentially rotates the rotary display body with respect to the handle main body. Therefore, the rotary display body can be differentially rotated with respect to rotation of the handle main body that rotates the valve rod.

Specifically, when the number of teeth of the handle-side gear is larger than the number of teeth of the display body-side gear, the rotary display body rotates faster than the handle main body rotates. By contrast, when the number of teeth of the handle-side gear is smaller than the number of teeth of the display body-side gear, the rotary display body rotates slower than the handle main body rotates.

Further, the handle main body is formed of a visual recognition restricting body that covers the rotary display body, has an opening that opens to allow a required portion of the display portion to be visually recognized from an outside and restricts visual recognition of a portion other than the required portion from the outside, and a translucent cover body that covers an entire outer side of the visual recognition restricting body and is translucent to allow visual recognition from at least an outer side of the opening. Therefore, the translucent cover body covers the entire outer side of the visual recognition restricting body having the opening that opens to allow the required portion of the display portion to be visually recognized from the outside, thereby preventing entry of foreign matter from the opening.

Furthermore, since the visual recognition restricting body having the opening that opens to allow the required portion of the display portion to be visually recognized from the outside is covered over the rotary display body that differentially rotates with respect to the handle main body, the open/closed display can be accurately performed with respect to the outside through the opening.

Even if the translucent cover body is covered so as to cover the entire rotary display body that differentially rotates with respect to the handle main body, and the visual recognition restricting body is covered over the outer side thereof, foreign matter is prevented from entering the inside. Since the rotary display body differentially rotates with respect to the handle main body, the open/closed display can be performed through the opening of the visual recognition restricting body arranged on an outermost side.

However, since the translucent cover body is interposed between the rotary display body and the visual recognition restricting body that restricts visual recognition of the portion other than the required portion of the display portion from the outside, that is, the portion other than the required portion of the display portion and the visual recognition restricting body are arranged at a radial interval equal to or larger than the thickness of the translucent cover body, the open/closed display can be accurately performed when visually recognized from the outer side in a radial direction with respect to the opening, but when the opening is visually recognized from an oblique direction, visual recognition of the portion other than the required portion from the outside cannot be accurately restricted, that is, an error due to the radial interval may occur, and the open/closed display may not be accurately performed.

In order to secure strength for rotating the valve rod, the translucent cover body that constitutes the handle main body is thick. The greater the thickness is, the more difficult it is to accurately restrict visual recognition from the outside with respect to the portion other than the required portion when the opening is visually recognized from the oblique direction, and the more likely the open/closed display cannot be accurately performed.

On the other hand, since the visual recognition restricting body having the opening that opens to allow the required portion of the display portion to be visually recognized from the outside is covered over the rotary display body that differentially rotates with respect to the handle main body, that is, the radial interval between the portion other than the required portion of the display portion and the visual recognition restricting body is small, the open/closed display can be accurately performed to the outside through the opening.

As an aspect of the present invention, the entire translucent cover body may allow the inside to be visually recognized from the outside.

According to the present invention, the entire translucent cover body is translucent, that is, the entire translucent cover body is formed of one translucent component. Therefore, the translucent cover body can be configured to be stronger than the translucent cover body configured by assembling of a translucent member and a non-translucent member.

Further, as an aspect of the present invention, the visual recognition restricting body may be formed to be thinner than the translucent cover body.

According to the present invention, the open/closed display can be more accurately performed. Specifically, since the visual recognition restricting body is thinner than the translucent cover body, the open/closed display can be accurately performed regardless of the visual recognition direction.

Further, as an aspect of the present invention, the display portion may be provided with an open/closed degree display that visually displays an open/closed degree by a visible length, number, amount, and figure.

The above-mentioned open/closed degree display for visually displaying the open/closed degree by the visible length, number, amount, and figure is, for example, displaying the open/closed degree by a bar displayed on the display portion becoming longer or shorter as the valve state changes from the closed valve state to the open valve state, the number of marks gradually increasing or decreasing, a scale increasing or decreasing, and a figure displayed gradually increasing or decreasing.

According to the present invention, in addition to the accurate open/closed display, an open valve degree in the open valve state and a closed valve degree in the closed valve state can be displayed. Therefore, it is possible to confirm a fully open state and a valve state for the fully open state. Accordingly, for example, when the valve state is in the fully open state or close to the fully open state, it is possible to prevent excessive rotation caused by over-rotation.

Further, as an aspect of the present invention, the display portion may be configured by a combination of an open display portion that displays the open valve state and a closed display portion that displays the closed valve state.

According to the present invention, the valve is open when the open display portion is displayed, or the valve is open when the open display portion is displayed. Therefore, it is possible to prevent the open valve state from being confused with the closed valve state.

Further, as an aspect of the present invention, the display portion may include a plurality of combinations of the open display portion and the closed display portion, and a plurality of the openings in the visual recognition restricting body may be provided in correspondence with the number of the combinations of the open display portion and the closed display portion.

According to the present invention, since the open/closed display can be performed at a plurality of locations, the open/closed display can be visually recognized from any angle.

Further, as an aspect of the present invention, an excessive rotation display portion for displaying an excessive rotation state may be provided on at least one of a side opposite to an open valve direction of the open display portion and a side opposite to a closed valve direction of the closed display portion.

The excessive rotation display portion may be provided in an excessive rotation region for a fully closed state or the fully open state, or may be provided over the excessive rotation region before the fully closed state or the fully open state.

According to the present invention, it is possible to prevent the excessive rotation state. When the open/closed display is performed simply with the open display portion and the closed display portion, the excessive rotation state cannot be recognized even when excessive rotation is occurring. However, the excessive rotation state can be recognized through visual recognition of the excessive rotation display portion.

Further, as an aspect of the present invention, the opening may be configured with an upper opening that opens upward in the handle main body and a side opening that opens laterally in the handle main body.

According to the present invention, the open/closed display can be visually recognized from above the handle and from a side of the handle.

Further, as an aspect of the present invention, the visual recognition restricting body may be integrated with the handle-side gear.

Further, the present invention is characterized in that a valve device includes the above-mentioned opening and closing handle that is mounted on the valve rod of the open/closed valve.

According to the present invention, it is possible to configure the valve device with which the open/closed valve state can be accurately visually recognized, and with which entry of foreign matter into the opening and closing handle can be prevented.

Advantageous Effects of Invention

According to the present invention, it is possible to provide an opening and closing handle with which an open/closed valve state can be accurately visually recognized, and with which entry of foreign matter can be prevented, and a valve device including the opening and closing handle.

DESCRIPTION OF EMBODIMENT

One embodiment of the present invention will be described with reference to FIGS. 1 to 8.

Figure 1:
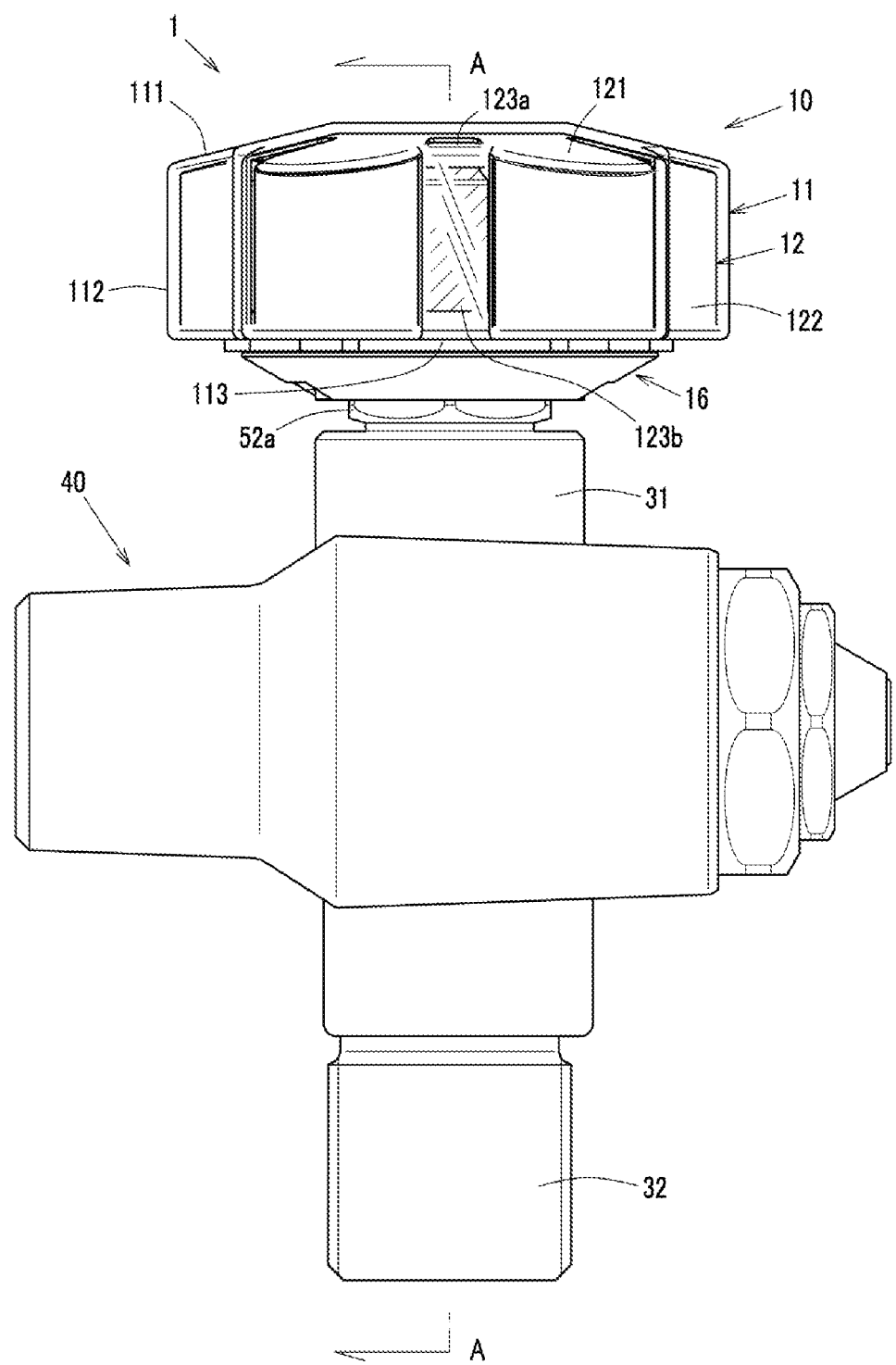
FIG. 1 is a front view of a valve device.
Figure 2:
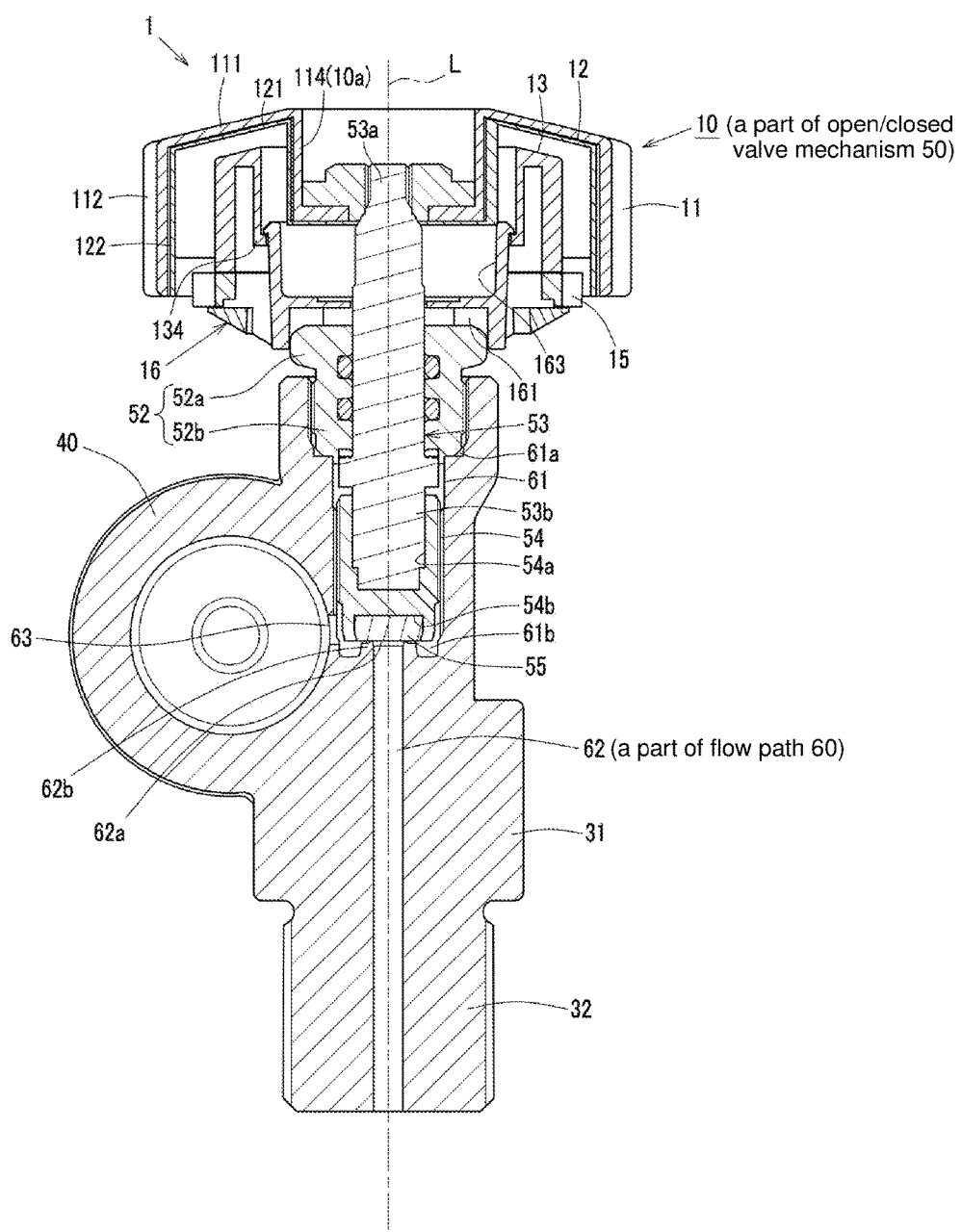
FIG. 2 is a sectional view of the valve device.
Figure 3:
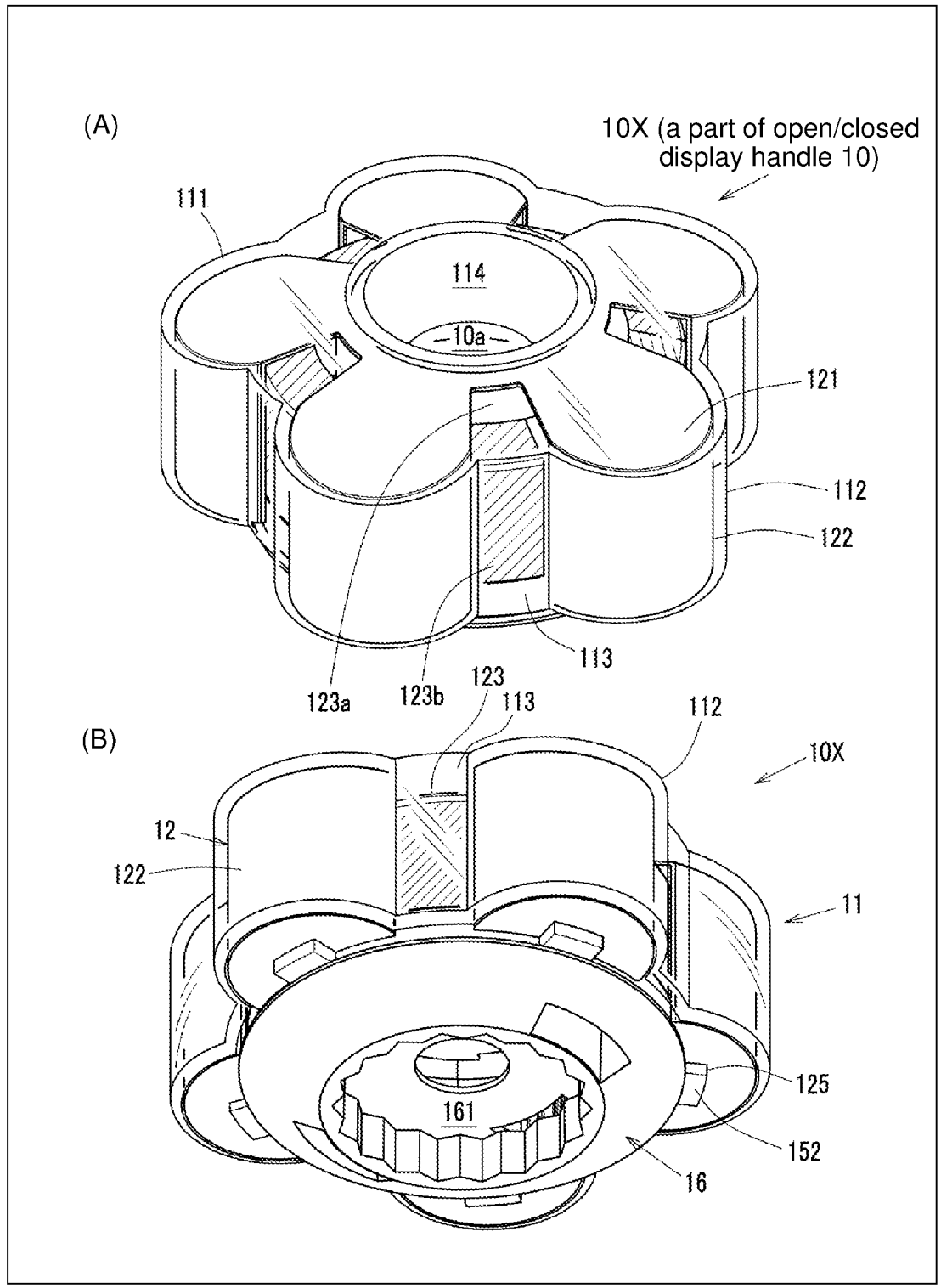
FIG. 3 is an explanatory diagram by perspective views of an open/closed display handle.
Figure 4:
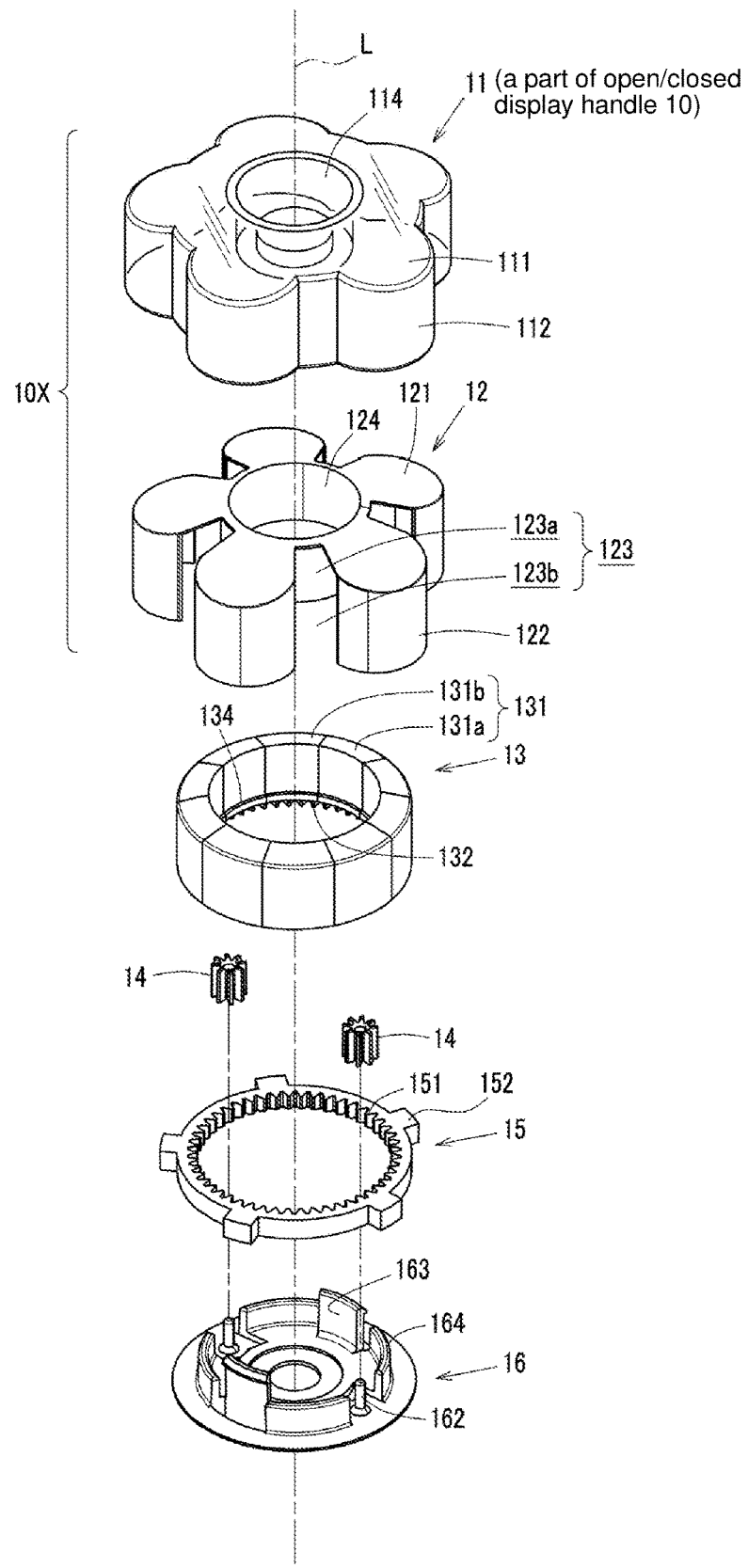
FIG. 4 is an exploded perspective view of the open/closed display handle.
Figure 5:
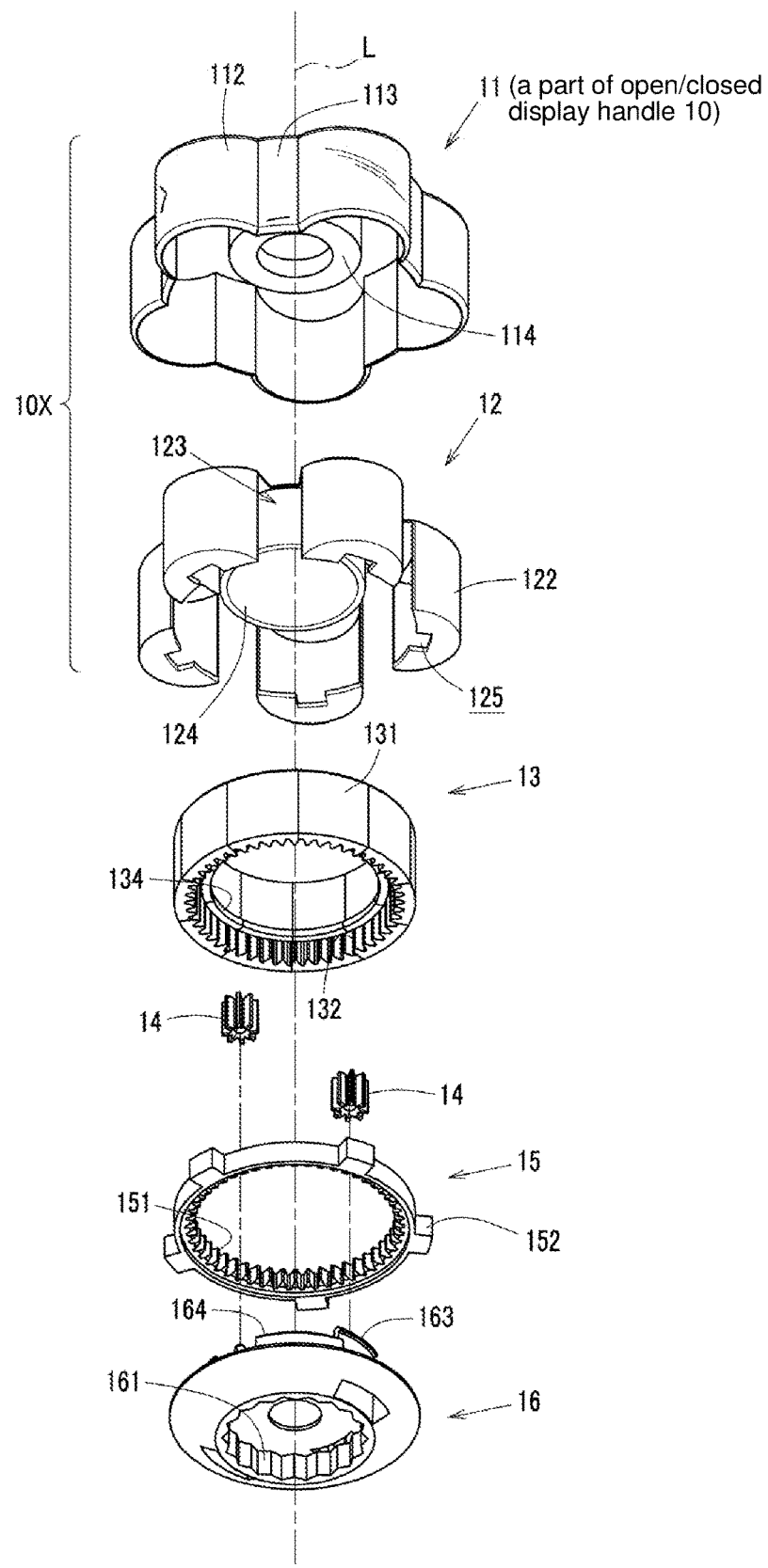
FIG. 5 is an exploded perspective view of the open/closed display handle.
Figure 6:
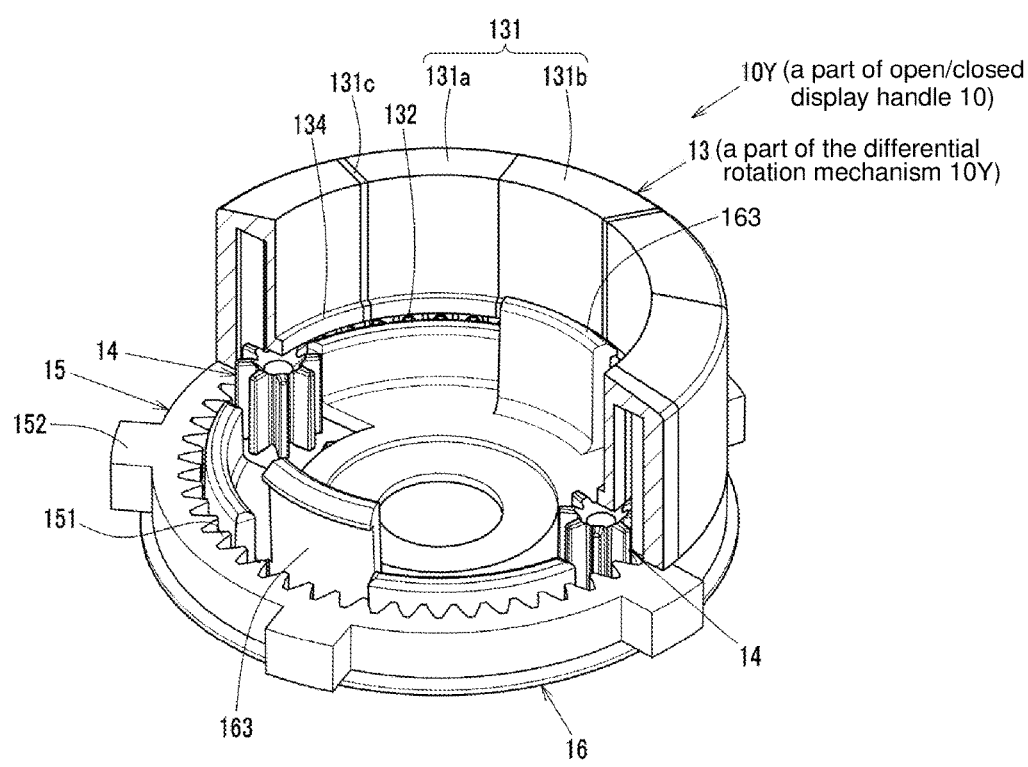
FIG. 6 is a perspective view of a differential mechanism.
Figure 7:
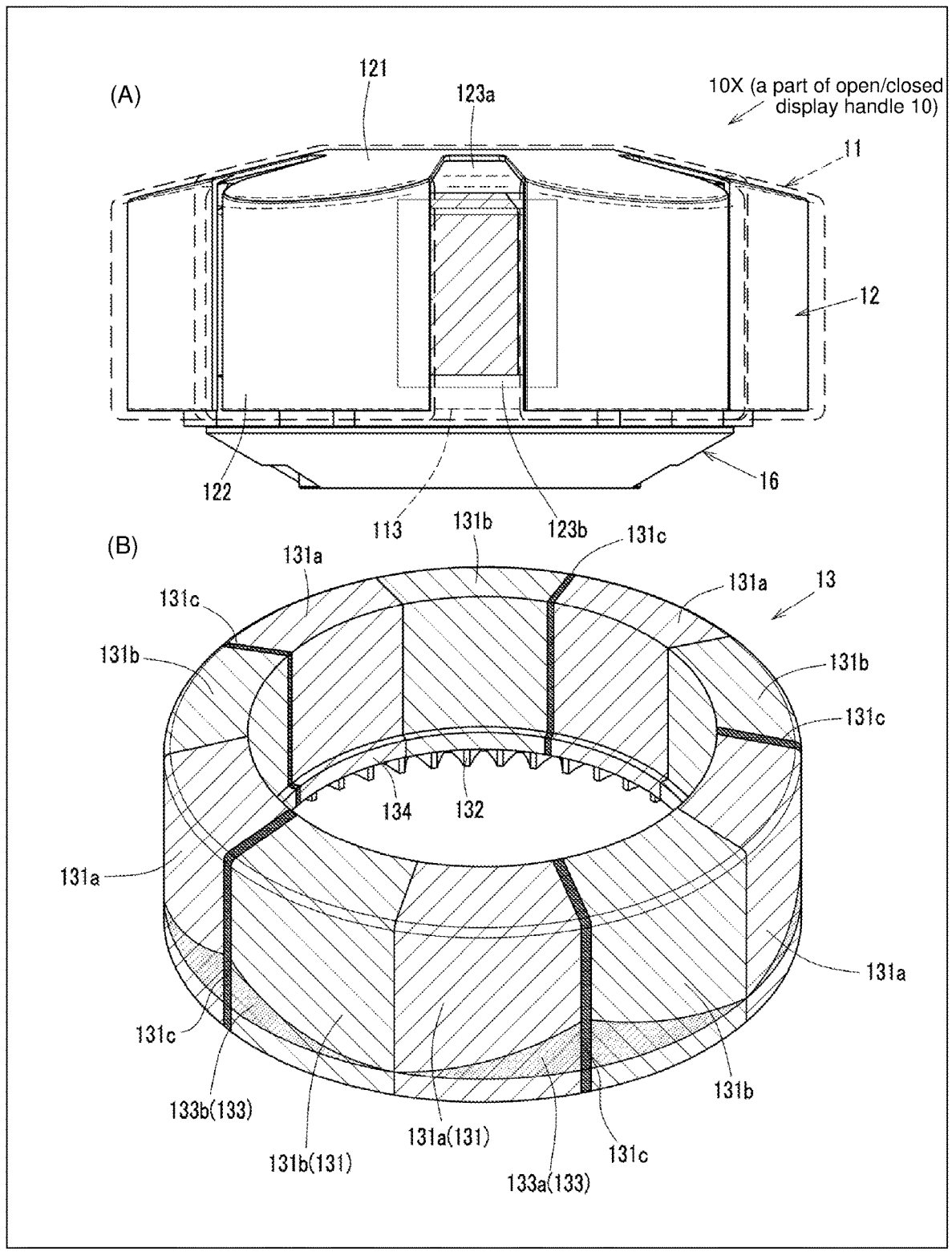
FIG. 7 is an explanatory diagram for explaining open/closed display by the open/closed display handle.
Figure 8:
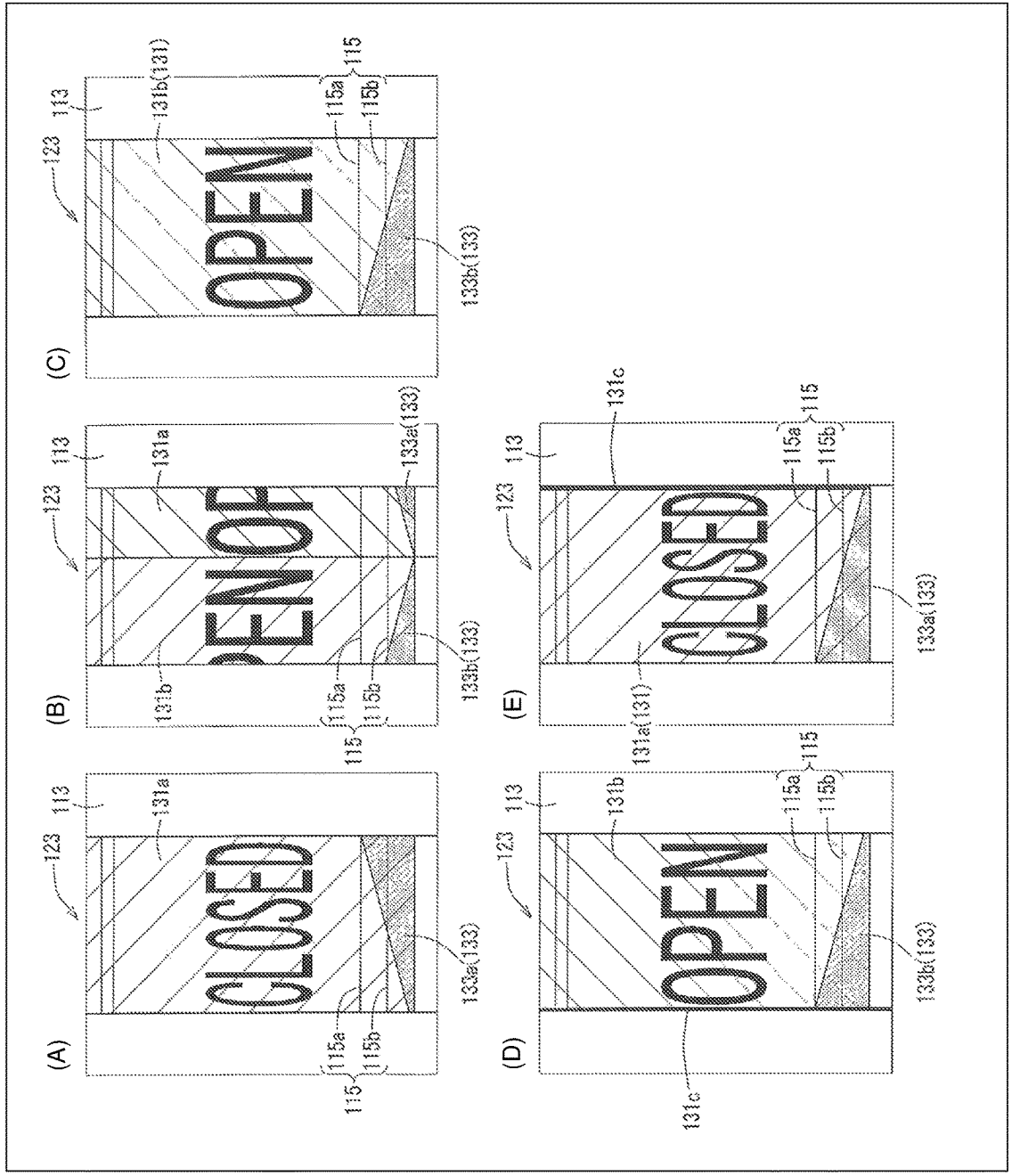
FIG. 8 is an explanatory diagram for explaining the open/closed display by the open/closed display handle.

FIG. 1 shows a front view of a valve device 1, FIG. 2 shows a sectional view of the valve device 1, FIG. 3 shows an explanatory diagram by perspective views of an open/closed display handle 10, FIGS. 4 and 5 show exploded perspective views of the open/closed display handle 10, FIG. 6 shows a perspective view of a differential rotation mechanism 10Y, and FIGS. 7 and 8 show explanatory diagrams for explaining open/closed display by the open/closed display handle 10.

More specifically, FIG. 2 shows a sectional view taken along line A-A of FIG. 1, FIG. 3(a) shows a perspective view of the open/closed display handle 10 from above, FIG. 3(b) shows a perspective view of the open/closed display handle 10 from below, FIG. 4 shows an exploded perspective view of the open/closed display handle 10 from above, and FIG. 5 shows an exploded perspective view of the open/closed display handle 10 from below. Further, in FIG. 6, in order to explain a configuration of the differential rotation mechanism 10Y, a part of a front side of a rotary display body 13 that constitutes the differential rotation mechanism 10Y is cut out.

FIG. 7(a) shows an enlarged front view of the open/closed display handle 10, FIG. 7(b) shows an enlarged perspective view of the rotary display body 13, and FIG. 8 shows a display state of the open/closed display visually recognized from openings 123. Specifically, FIG. 8(a) shows the open/closed display in a closed valve state, FIG. 8(b) shows the open/closed display in a state in the middle of going from the closed valve state to an open valve state, FIG. 8(c) shows the open/closed display in the open valve state, FIG. 8(d) shows excessive rotation display in the open valve state, and FIG. 8(e) shows the excessive rotation display in the closed valve state.

The valve device 1 is a container valve device that is mounted on an upper portion of a cylinder container, which is not shown (not shown), and includes a vertically long housing 31, a container attaching portion 32 that is screwed onto an upper portion of the cylinder container (not shown) in a lower portion of the housing 31, an outlet 40 that projects laterally near a middle stage of the housing 31, an open/closed valve mechanism 50 that is mounted on an upper portion of the housing 31, and the open/closed display handle 10 that is mounted on the open/closed valve mechanism 50.

Although an O-ring is installed in a portion where respective constituents face each other in the open/closed valve mechanism 50, or at an appropriate location of a portion where the open/closed valve mechanism 50 and the housing 31 face each other, illustrations and detailed description of the O-ring are appropriately omitted.

Inside the housing 31, as shown in FIG. 2, a closing valve mounting recess 61 that allows mounting of the open/closed valve mechanism 50 in an upper portion, a primary side flow path 62 that communicates from a lower end of the closing valve mounting recess 61 to a lower end of the container attaching portion 32, and a secondary side flow path 63 that communicates from the lower end of the closing valve mounting recess 61 to a tip of the outlet 40 are provided.

The closing valve mounting recess 61 includes a working chamber 61a, which is a substantially cylindrical recess whose upper part is opened, and a closing valve chamber 61b having a slightly smaller diameter than the working chamber 61a below the working chamber 61a. A bottom surface of the closing valve chamber 61b communicates with an upper end of the primary side flow path 62 to form an upper end opening 62*a*, and an opening valve seat 62*b* projecting upward along an outer edge of the upper end opening 62*a* is formed.

In the housing 31, the closing valve chamber 61*b*, the primary side flow path 62, and the secondary side flow path 63 form a flow path 60, which communicates from the lower end of the container attaching portion 32 to the tip of the outlet 40.

As shown in FIG. 2, the open/closed valve mechanism 50 mounted in the closing valve mounting recess 61 is configured with the open/closed display handle 10, a ground nut 52, a spindle 53, an intermediate transmission tool 54, and a closing member 55 mounted on a bottom surface of the intermediate transmission tool 54.

The open/closed display handle 10 includes a fitting portion 10*a* that allows fitting of a fitted portion 53*a* at a top of the spindle 53, details of which will be described later.

The ground nut 52 has a hollow, substantially cylindrical shape including a head nut portion 52*a* and a male screw portion 52*b* that is screwed into a female screw formed on an inner surface of the working chamber 61*a* of the closing valve mounting recess 61.

As shown in FIG. 2, the spindle 53 is provided with the fitted portion 53*a* that fits into the fitting portion 10*a* of the open/closed display handle 10 at the top, and a fitting portion 53*b* that fits into a spindle fitting recess 54*a* of the intermediate transmission tool 54 at a bottom.

As shown in FIG. 2, the intermediate transmission tool 54 has a substantially columnar shape and is provided with the spindle fitting recess 54*a* that allows the fitting portion 53*b* of the spindle 53 to fit therein at a top, and a closing member fitting recess 54*b* that allows the closing member 55 to fit therein at a bottom.

As shown in FIG. 2, the closing member 55 is an elastic member that is circular in plan view and that fits into the closing member fitting recess 54*b* of the intermediate transmission tool 54, and is configured so as to allow the opening valve seat 62*b* to bite thereinto in the closed valve state.

As described above, the open/closed valve mechanism 50 including the open/closed display handle 10, the ground nut 52, the spindle 53, the intermediate transmission tool 54, and the closing member 55 is mounted in the closing valve mounting recess 61 through fitting of the closing member 55 into the closing member fitting recess 54*b* of the intermediate transmission tool 54, and fitting of the fitting portion 53*b* of the spindle 53 into the spindle fitting recess 54*a* of the intermediate transmission tool 54 so as to mount the ground nut 52 on the spindle 53, and screw the male screw portion 52*b* of the ground nut 52 into the female screw of the closing valve mounting recess 61. Then, the fitting portion 10*a* of the open/closed display handle 10 is fitted into the fitted portion 53*a* of the spindle 53 and thus assembling of the open/closed valve mechanism 50 is completed.

The open/closed valve mechanism 50 configured in this way is configured such that the open/closed display handle 10 is screwed and rotated in a tightening direction about a vertical axis L passing through a center of the spindle 53, whereby the intermediate transmission tool 54 is pressed down via the spindle 53. At this time, the opening valve seat 62*b* formed around the upper end opening 62*a* bites into the closing member 55 fitted into the closing member fitting recess 54*b* of the intermediate transmission tool 54, and the closing member 55 seals the upper end opening 62*a*. This state is called a closed valve state (fully closed state).

Conversely, when the open/closed display handle 10 is rotated in a loosening direction about the axis L and the spindle 53 is screwed out, the intermediate transmission tool 54 moves upward via the spindle 53, as a result of which the upper end opening 62*a* is opened, the primary side flow path 62, the closing valve chamber 61*b*, and the secondary side flow path 63 communicate with each other, and the flow path 60 becomes conductive. This state is called an open valve state.

The open/closed display handle 10 that performs the open/closed display by considering a closed state by the open/closed valve mechanism 50 to be the closed valve state and an open state by the open/closed valve mechanism 50 to be the open valve state includes a transparent cover body 11, a visual recognition restricting body 12, and the rotary display body 13, two planetary gears 14, an internal gear ring 15 and a rotary fixed body 16.

Further, in the open/closed display handle 10 having the above-mentioned configuration, the transparent cover body 11, the visual recognition restricting body 12, and the internal gear ring 15 form a handle main body 10X for rotating the spindle 53 of the open/closed valve mechanism 50 of the valve device 1. At the same time, a display body-side gear 132 of the rotary display body 13, the two planetary gears 14 pivotally supported by the rotary fixed body 16, and the internal gear ring 15 form the differential rotation mechanism 10Y.

The handle main body 10X formed of the transparent cover body 11, the visual recognition restricting body 12, and the internal gear ring 15 rotates the spindle 53 of the open/closed valve mechanism 50, includes a handle-side gear 151 of the internal gear ring 15 that rotates about the axis L, and has a substantially star shape with rounded corners projecting in an arc shape radially outward in five directions in plan view, and is provided with the fitting portion 10*a* in a lower portion of a center in plan view.

The transparent cover body 11 that constitutes the above-mentioned handle main body 10X has a substantially star-shaped cylindrical shape with rounded corners projecting in an arc shape radially outward in five directions that covers an entire outer side of the visual recognition restricting body 12 described later and is entirely made of a transparent resin that is translucent to allow visual recognition from outer sides of the openings 123 in the visual recognition restricting body 12.

More specifically, the transparent cover body 11 is formed of a star-shaped upper surface 111 having a substantially star shape with rounded corners projecting in an arc shape radially outward in five directions, and arc-shaped side surfaces 112 that are side surfaces of semi-arc-shaped portions projecting in the five directions of the star-shaped upper surface 111, and substantially flat side surface window portions 113 having a predetermined width between the arc-shaped side surfaces 112 adjacent to each other in a circumferential direction.

Five side surface window portions 113 are provided between the arc-shaped side surfaces 112 that are the side surfaces of the star-shaped upper surface 111 having a substantially star shape with rounded corners projecting in an arc shape radially outward in the five directions.

Further, at the center in plan view, a bottomed cylindrical fitting recess 114 having a through hole 114*a* at a bottom surface penetrating in a vertical direction and having the spindle 53 inserted therethrough is provided.

The visual recognition restricting body 12, which is arranged on an inner side of the transparent cover body 11 and covers the rotary display body 13 described later, has a substantially star shape with rounded corners projecting in an arc shape radially outward in five directions slightly smaller than the transparent cover body 11, and an insertion hole 124 into which the fitting recess 114 of the transparent cover body 11 is inserted is provided at the center in plan view. The visual recognition restricting body 12 is made thinner than the transparent cover body 11.

Specifically, around the insertion hole 124 at the center in plan view, a horseshoe upper surface 121 having horseshoe shapes in plan view projecting in five directions, and arc-shaped side surfaces 122 in arc portions on a radially outer side of the respective horseshoe shapes in the horseshoe upper surface 121 are integrally configured, and the openings 123 are formed between portions of the horseshoe upper surface 121 and the arc-shaped side surfaces 122 adjacent to each other in the circumferential direction.

Five openings 123 are provided between horseshoe-shaped portions in plan view projecting in five directions on the horseshoe upper surface 121 and the arc-shaped side surfaces 122.

The horseshoe upper surface 121 has a substantially dome shape in which a center side in plan view projects upward. In addition, a portion of each opening 123 between adjacent portions of the horseshoe upper surface 121 in the circumferential direction is an upper opening 123a, and a portion of the opening 123 between the arc-shaped side surfaces 122 adjacent to each other in the circumferential direction is a side opening 123b. A width of the opening 123 is formed smaller than a width of a closed display portion 131a and an open display portion 131b. In addition, fitting portions 125 that fit into fitting projections 152 of the internal gear ring 15, which will be described later, are provided at bottoms of the arc-shaped side surfaces 122 of the visual recognition restricting body 12.

The rotary display body 13 has an open/closed display portion 131 for displaying the valve state of the open/closed valve mechanism 50, has a ring shape formed of an outer wall and an inner wall, and is provided with a display body-side gear 132 formed of a plurality of gear teeth, which are formed on an inner peripheral surface of a lower end of the outer wall extending downward and mesh with the planetary gears 14 described later. In addition, an engaging projection 134 that projects radially inward is provided at the lower end of the inner wall.

As shown in FIG. 7(b), in the open/closed display portion 131, a closed display portion 131a having a predetermined width, an open display portion 131b having a predetermined width, and an excessive rotation display portion 131c having a narrow width are arranged in this order in the circumferential direction, and repeatedly arranged. In this embodiment, five sets of the closed display portion 131a, the open display portion 131b, and the excessive rotation display portion 131c are provided in the circumferential direction.

The closed display portion 131a that displays the closed valve state displays a word "closed" and its background in red, the open display portion 131b that displays the open valve state displays a word "open" and its background in green, and the excessive rotation display portion 131c is displayed in yellow.

In FIGS. 4, 5, and 7, character display and an open/closed degree display portion 133 described later are not shown. In addition, the open/closed display portion 131 is provided over an outer peripheral surface and an upper surface of the rotary display body 13 formed of the outer wall and the inner wall and having a ring shape.

Further, the closed display portion 131a and the open display portion 131b includes the open/closed degree display portion 133 in addition to the open/closed display with the characters and the background colors described above. A closed degree display 133a displayed on the closed display portion 131a of the open/closed degree display portion 133 is shown as a right-angled triangular shape in a front view, which, starting in the circumferential direction from a boundary with the adjacent open display portion 131b (clockwise adjacent side in the present embodiment (left side in FIG. 8)), gradually increases toward the excessive rotation display portion 131c adjacent to the opposite side in the circumferential direction (counterclockwise adjacent side in the present embodiment (right side in FIG. 8)).

An open degree display 133b displayed on the open display portion 131b of the open/closed degree display portion 133 is shown as a right-angled triangular shape in the front view, which, starting in the circumferential direction from a boundary with the adjacent closed display portion 131a (counterclockwise adjacent side in this embodiment (right side in FIG. 8)), gradually increases toward the excessive rotation display portion 131c adjacent to the opposite side in the circumferential direction (the clockwise adjacent side in the present embodiment (left side in FIG. 8)).

The planetary gears 14 are gears that are pivotally supported by support columns 162 of the rotary fixed body 16 described later, and two planetary gears 14 are provided so as to sandwich the axis L in plan view. Each planetary gear 14 is configured to have a height about twice that of the internal gear ring 15 described later.

The internal gear ring 15 is a ring body having a same outer diameter as the outer wall of the rotary display body 13, includes a plurality of gear teeth along an inner circumference, and is provided with the handle-side gear 151 that meshes with the planetary gears 14, and a plurality of the fitting projections 152 projecting radially outward on an outer circumference of the ring body.

The number of gear teeth of the handle-side gear 151 that meshes with the planetary gears 14, that is, the number of gears is larger than the number of gears of the display body-side gear 132 that meshes with the planetary gears 14. In the present embodiment, the number of gears of the display body-side gear 132 is 44 and the number of gears of the handle-side gear 151 is 50.

The rotary fixed body 16 is a disk-shaped member that constitutes a bottom of the open/closed display handle 10, and has a fixed recess 161 into which the head nut portion 52a fits, and the support columns 162, engaging hooks 163, and position restricting walls 164 on an upper surface.

The fixed recess 161 is a recessed portion that has 18 corners and is recessed upward so that the head nut portion 52a having a hexagonal shape in plan view can be fitted in three directions, and is configured so as to be fitted from above the head nut portion 52a.

The support columns 162 are cylindrical columns that pivotally support the planetary gears 14 at radial positions at which the planetary gears 14 can mesh with the display body-side gear 132 and the handle-side gear 151. Two support columns 162 are arranged at positions symmetrical about the axis L in a plan view direction.

The engaging hooks 163 are hooks that engage with the engaging projection 134 provided on the inner peripheral surface of the inner wall of the rotary display body 13, and the two engaging hooks 163 are arranged at positions symmetrical about the axis L in the plan view direction and in a direction orthogonal to the two support columns 162.

The position restricting walls 164 are walls that are formed between the two support columns 162 and the two engaging hooks 163 and have arc shapes in plan view, are located on an inner side of the internal gear ring 15 that is placed on the upper surface of the rotary fixed body 16, and are configured to restrict the plan view direction of the internal gear ring 15 with respect to the rotary fixed body 16.

Assembling of the open/closed display handle 10 in which each constituent is configured as described above will be described below.

First, the planetary gears 14 are mounted on the support columns 162 of the rotary fixed body 16, and the internal gear ring 15 is placed on the upper surface of the rotary fixed body 16. From above the internal gear ring 15, the rotary display body 13 is installed to form the differential rotation mechanism 10Y as shown in FIG. 6.

Specifically, the internal gear ring 15 placed on the upper surface of the rotary fixed body 16 is rotatably placed in a state where a position in the plan view direction with respect to the rotary fixed body 16 is restricted by the position restricting walls 164.

At this time, the planetary gears 14 and the handle-side gear 151 of the internal gear ring 15 mesh with each other.

Further, since the rotary display body 13 is installed on the internal gear ring 15 and the engaging hooks 163 are engaged with the engaging projection 134, the rotary display body 13 is restricted in the vertical direction with respect to the rotary fixed body 16, but is rotatably installed with respect to the rotary fixed body 16.

At this time, the display body-side gear 132 of the rotary display body 13 also meshes with the planetary gears 14.

This means that the planetary gears 14 mesh with the handle-side gear 151 of the internal gear ring 15 at a lower side, and mesh with the display body-side gear 132 of the rotary display body 13 at an upper side. Therefore, when one of the rotary display body 13 and the internal gear ring 15 is rotated with respect to the rotary fixed body 16, the differential rotation mechanism 10Y can rotate the other in the same direction via the planetary gears 14.

Specifically, when the internal gear ring 15 is rotated with respect to the rotary fixed body 16, the planetary gears 14 that are pivotally supported by the rotary fixed body 16 mesh with the handle-side gear 151 of the internal gear ring 15 at the lower side, and thus rotate. Since the display body-side gear 132 of the rotary display body 13 meshes with upper parts of the planetary gears 14 that rotate, the rotary display body 13 rotates in the same direction as the internal gear ring 15 by the rotation of the planetary gears 14.

At this time, since the number of gears of handle-side gear 151 of the internal gear ring 15 is different from the number of gears of the display body-side gear 132 of the rotary display body 13, the rotary display body 13 and the internal gear ring 15 rotating in the same direction rotate at different rotational speeds, that is, the rotary display body 13 and the internal gear ring 15 rotate differentially. In the present embodiment in which the number of gears of the handle-side gear 151 is formed to be greater than the number of gears of the display body-side gear 132, the rotary display body 13 rotates faster than the internal gear ring 15 rotates, that is, a speed increasing mechanism that increases rotation speed can be configured.

While the differential rotation mechanism 10Y is formed by assembling the rotary fixed body 16, the internal gear ring 15, the planetary gears 14, and the rotary display body 13 in this way, the handle main body 10X formed of the visual recognition restricting body 12 and the transparent cover body 11 is assembled so as to configure the open/closed display handle 10.

More specifically, the visual recognition restricting body 12 constituting the handle main body 10X is covered over the rotary display body 13 and integrated with the internal gear ring 15. The internal gear ring 15 and the visual recognition restricting body 12 are integrated by fitting the fitting projections 152 of the internal gear ring 15 into the fitting portions 125 of the visual recognition restricting body 12.

As a result, the rotary display body 13 is enclosed in the vertical direction by the integrated visual recognition restricting body 12 and the internal gear ring 15. The rotary display body 13 enclosed by the visual recognition restricting body 12 and the internal gear ring 15 can rotate with respect to the visual recognition restricting body 12 and the internal gear ring 15, and the open/closed display portion 131 of the rotary display body 13 can be visually recognized from the outside through the openings 123 of the visual recognition restricting body 12.

In this way, the handle main body 10X is configured by covering the visual recognition restricting body 12, which covers the rotary display body 13, with the transparent cover body 11 from above for integration, and thus assembly of the open/closed display handle 10 is completed. The handle main body 10X may be constructed by assembling the visual recognition restricting body 12 and the transparent cover body 11, and then the handle main body 10X may be mounted so as to cover the rotary display body 13 with the visual recognition restricting body 12.

Since the open/closed display handle 10 assembled in this way has the transparent cover body 11 as a whole being transparent, as described above, the open/closed display portion 131 of the rotary display body 13 can be visually recognized from the outside through the openings 123 of the visual recognition restricting body 12 and the valve state and the open/closed degree can be displayed (see FIG. 8).

Further, a horizontal reference line 115 is provided on the transparent cover body 11 that forms the side surface window portions 113. The reference line 115 displays an upper reference line 115$a$ arranged in an upper part corresponding to a top of the right-angled triangular open/closed degree display portion 133 and an intermediate reference line 115$b$ arranged at a position approximately half a height of the upper reference line 115$a$.

Next, the open/closed display on the open/closed display handle 10 will be described in detail.

First, a case where the open/closed display handle 10 is rotated from the fully closed state (see FIG. 8($a$)) to the fully open state (see FIG. 8($c$)) will be described.

In the fully closed state shown in FIG. 8($a$), each side surface window portion 113 displays the closed display portion 131$a$, and the top of the right-angled triangular closed degree display 133$a$ and the upper reference line 115$a$ coincide with each other.

In order to open the valve from the fully closed state, the open/closed display handle 10 is rotated in a direction in which the spindle 53 is screwed out, that is, counterclockwise. Through the rotation of the open/closed display handle 10, since the rotary fixed body 16 is fixed to the head nut portion 52$a$, the rotary fixed body 16 and the handle main body 10X relatively rotate. Through the relative rotation of the handle main body 10X with respect to the rotary fixed body 16, the rotary display body 13 is rotated, by the differential rotation mechanism 10Y, relative to the rotary fixed body 16 that is rotatably fixed, and is differentially rotated with respect to the handle main body 10X.

Therefore, as shown in FIG. 8($b$), the side surface window portion 113 displays both the closed display portion 131$a$ and the open display portion 131$b$ of the rotary display body 13 that has been differentially rotated with respect to the handle main body 10X. In this display state, it can be visually recognized that the valve is opened from the fully closed state.

A degree of the opening can be displayed by the open degree display 133*b* displayed on a rear side in a moving direction in the side surface window portion 113. Specifically, since the open degree in the state shown in FIG. 8(*b*) is such that the open degree display 133*b* exposed on a left side of the side surface window portion 113 coincides with the intermediate reference line 115*b*, it can be visually recognized that the open state is about 50% compared with the fully open state.

Further, when the open/closed display handle 10 is rotated counterclockwise, the open display portion 131*b* exposed in the side surface window portion 113 becomes larger than the closed display portion 131*a*, and the open degree display 133*b* exposed on the left side of the side surface window portion 113 becomes higher and approaches the upper reference line 115*a*. This means that it can be recognized that the open state is approaching the fully open state.

When the open/closed display handle 10 is rotated counterclockwise to the fully open state, as shown in FIG. 8(*c*), only the open display portion 131*b* is exposed in the side surface window portion 113 and the top of the open degree display 133*b* exposed on the left side of the side surface window portion 113 coincides with the upper reference line 115*a*.

When the open/closed display handle 10 is further rotated counterclockwise from the fully open state, the spindle 53 bites exceeding a limit to which the spindle 53 can be screwed out. Therefore, in such an excessive rotation state exceeding the fully open state, as shown in FIG. 8(*d*), the excessive rotation display portion 131*c* is exposed on the left side of the side surface window portion 113 and the excessive rotation state can be visually recognized.

By contrast, in the excessive rotation state of a tightening direction in which the open/closed display handle 10 is rotated clockwise from the fully closed state shown in FIG. 8(*a*), the spindle 53 bites in the same way as the excessive rotation state in the open state, and the closing member 55 fitted into the closing member fitting recess 54*b* of the intermediate transmission tool 54 may be compacted and crack. Therefore, in the excessive rotation state exceeding the fully closed state described above, as shown in FIG. 8(*e*), the excessive rotation display portion 131*c* is exposed on a right side of the side surface window portion 113 and the excessive rotation state can be visually recognized.

As described above, the open/closed display handle 10 that rotates the spindle 53 of the open/closed valve mechanism 50 of the valve device 1 includes: the handle main body 10X that rotates the spindle 53 and has a handle-side gear 151 that rotates about the axis L of the spindle 53; the rotary display body 13 that has the open/closed display portion 131 that displays at least one of the open valve state and the closed valve state of the open/closed valve mechanism 50, and the display body-side gear 132 that rotates about the axis L of the spindle 53; and the rotary fixed body 16 that is rotatably fixed to the valve device 1 and pivotally supports the planetary gears 14, and the handle-side gear 151 includes the number of teeth different from the number of teeth of the display body-side gear 132, the planetary gears 14 that are pivotally supported by the rotary fixed body 16 that is rotatably fixed to the valve device 1, the handle-side gear 151 that meshes with the planetary gears 14, and the display body-side gear 132 that meshes with the planetary gears 14 form the differential rotation mechanism 10Y that differentially rotates the rotary display body 13 with respect to the handle main body 10X, and the handle main body 10X is formed of the visual recognition restricting body 12 that covers the rotary display body 13, has the openings 123 that open to allow a portion to be displayed portion of the open/closed display portion 131 to be visually recognized from the outside and restricts visual recognition of a non-display portion from the outside, and the transparent cover body 11 body that covers the entire outer side of the visual recognition restricting body 12 and is translucent to allow visual recognition from at least the outer sides of the openings 123, as a result of which it is possible to accurately visually recognize the open/closed valve state and prevent foreign matter from entering the open/closed display handle 10.

More specifically, as the open/closed display handle 10 that rotates the spindle 53 of the open/closed valve mechanism 50 of the valve device 1, the open/closed display handle 10 includes: the handle main body 10X that rotates the spindle 53 and has the handle-side gear 151 that rotates about the axis L of the spindle 53; the rotary display body 13 that has the open/closed display portion 131 that displays at least one of the open valve state and the closed valve state of the open/closed valve mechanism 50, and the display body-side gear 132 that rotates about the axis L of the spindle 53; and the rotary fixed body 16 that is rotatably fixed to the valve device 1 and pivotally supports the planetary gears 14, and the handle-side gear 151 includes the number of teeth different from the number of teeth of the display body-side gear 132, the planetary gears 14 that are pivotally supported by the rotary fixed body 16 that is rotatably fixed to the valve device 1, the handle-side gear 151 that meshes with the planetary gears 14, and the display body-side gear 132 that meshes with the planetary gears 14 form the differential rotation mechanism 10Y that differentially rotates the rotary display body 13 with respect to the handle main body 10X, as a result of which the rotary display body 13 can be differentially rotated with respect to rotation of the handle main body 10X that rotates the spindle 53.

Further, the handle main body 10X is formed of the visual recognition restricting body 12 that covers the rotary display body 13, has the openings 123 that open to allow the portion to be displayed of the open/closed display portion 131 to be visually recognized from the outside and restricts visual recognition of the non-display portion from the outside, and the transparent cover body 11 that covers the entire outer side of the visual recognition restricting body 12 and is translucent to allow visual recognition from at least the outer sides of the openings 123. Therefore, the transparent cover body 11 covers the entire outer side of the visual recognition restricting body 12 having the openings 123 that open to allow the portion to be displayed of the open/closed display portion 131 to be visually recognized from the outside, thereby preventing foreign matter from entering from the openings 123.

Furthermore, since the visual recognition restricting body 12 having the openings 123 that open to allow the portion to be displayed of the open/closed display portion 131 to be visually recognized from the outside is covered over the rotary display body 13 that differentially rotates with respect to the handle main body 10X. Therefore, the open/closed display can be accurately performed to the outside through the openings 123.

Even if the transparent cover body 11 is covered so as to cover the entire rotary display body 13 that differentially rotates with respect to the handle main body 10X, and the visual recognition restricting body 12 is covered over the outer side thereof, foreign matter is prevented from entering the inside, and through the differential rotation of the rotary display body 13 with respect to the handle main body 10X, the open/closed display can be performed through the openings 123 of the visual recognition restricting body 12 arranged on an outermost side.

However, since the transparent cover body 11 is interposed between the rotary display body 13 and the visual recognition restricting body 12 that restricts visual recognition of the non-display portion of the open/closed display portion 131 from the outside, that is, the non-display portion of the open/closed display portion 131 and the visual recognition restricting body 12 are arranged at a radial interval equal to or larger than the thickness of the transparent cover body 11, the open/closed display can be accurately performed when visually recognized from the outer side in a radial direction with respect to the openings 123, but when the openings 123 are visually recognized from an oblique direction, visual recognition of the non-display portion from the outside cannot be accurately restricted, which means that an error due to the radial interval may occur, and the open/closed display may not be accurately performed.

In order to secure strength for rotating the spindle 53, the transparent cover body 11 that constitutes the handle main body 10X is thick. The greater the thickness is, the more difficult it is to accurately restrict visual recognition from the outside with respect to the non-display portion when the openings 123 are visually recognized from the oblique direction, and the more likely the open/closed display cannot be accurately performed.

On the other hand, since the visual recognition restricting body 12 having the openings 123 that open to allows the portion to be displayed of the open/closed display portion 131 to be visually recognized from the outside is covered over the rotary display body 13 that differentially rotates with respect to the handle main body 10X, that is, the radial interval between the non-display portion of the open/closed display portion 131 and the visual recognition restricting body 12 is small, the open/closed display can be accurately performed to the outside through the openings 123.

Further, since the entire transparent cover body 11 is configured such that the inside can be visually recognized from the outside, the entire transparent cover body 11 is translucent, that is, the entire transparent cover body 11 is formed of one translucent component. Therefore, the transparent cover body 11 can be made stronger than the transparent cover body 11 configured by assembling a translucent member and a non-translucent member.

In addition, since the visual recognition restricting body 12 is formed to be thinner than the transparent cover body 11, the open/closed display can be more accurately performed regardless of the visual recognition direction.

Further, since the open/closed display portion 131 is provided with the open/closed degree display portion 133 that visually displays the open/closed degree by a visible length, in addition to the accurate open/closed display, the open valve degree in the open valve state and the closed valve degree in the closed valve state can be displayed. Therefore, it is possible to confirm the fully open state and the valve state for the fully open state. Accordingly, for example, when the valve state is in the fully open state or close to the fully open state, it is possible to prevent excessive rotation caused by over-rotation.

Further, since the open/closed display portion 131 is configured by a combination of the open display portion 131b that displays the open valve state and the closed display portion 131a that displays the closed valve state, the valve is open when the open display portion 131b is displayed, or the valve is open when the open display portion 131b is displayed. Therefore, it is possible to prevent the open valve state from being confused with the closed valve state.

Further, the open/closed display portion 131 is configured by a plurality of combinations of the open display portion 131b and the closed display portion 131a, and a plurality of the openings 123 in the visual recognition restricting body 12 are provided corresponding to the number of combinations of the open display portion 131b and the closed display portion 131a. Therefore, since the open/closed display can be performed at a plurality of locations, the open/closed display can be visually recognized from any angle.

Further, the excessive rotation display portion 131c for displaying the excessive rotation state is provided on at least one of a side opposite to an open valve direction of the open display portion 131b and a side opposite to a closed valve direction of the closed display portion 131a. Therefore, it is possible to prevent the excessive rotation state. When the open/closed display is performed simply with the open display portion 131b and the closed display portion 131a, the excessive rotation state cannot be recognized even when excessive rotation is occurring. However, the excessive rotation state can be recognized through visual recognition of the excessive rotation display portion 131c.

Further, since each opening 123 includes the upper opening 123a that opens upward in the handle main body 10X and the side opening 123b that opens laterally in the handle main body 10X. Therefore, the open/closed display can be visually recognized from above and a side of the handle.

With the valve device 1 in which the open/closed display handle 10 described above is mounted on the spindle 53 of the open/closed valve mechanism 50, the open/closed valve state can be accurately visually recognized and foreign matter can be prevented from entering the open/closed display handle 10.

Figure 9:
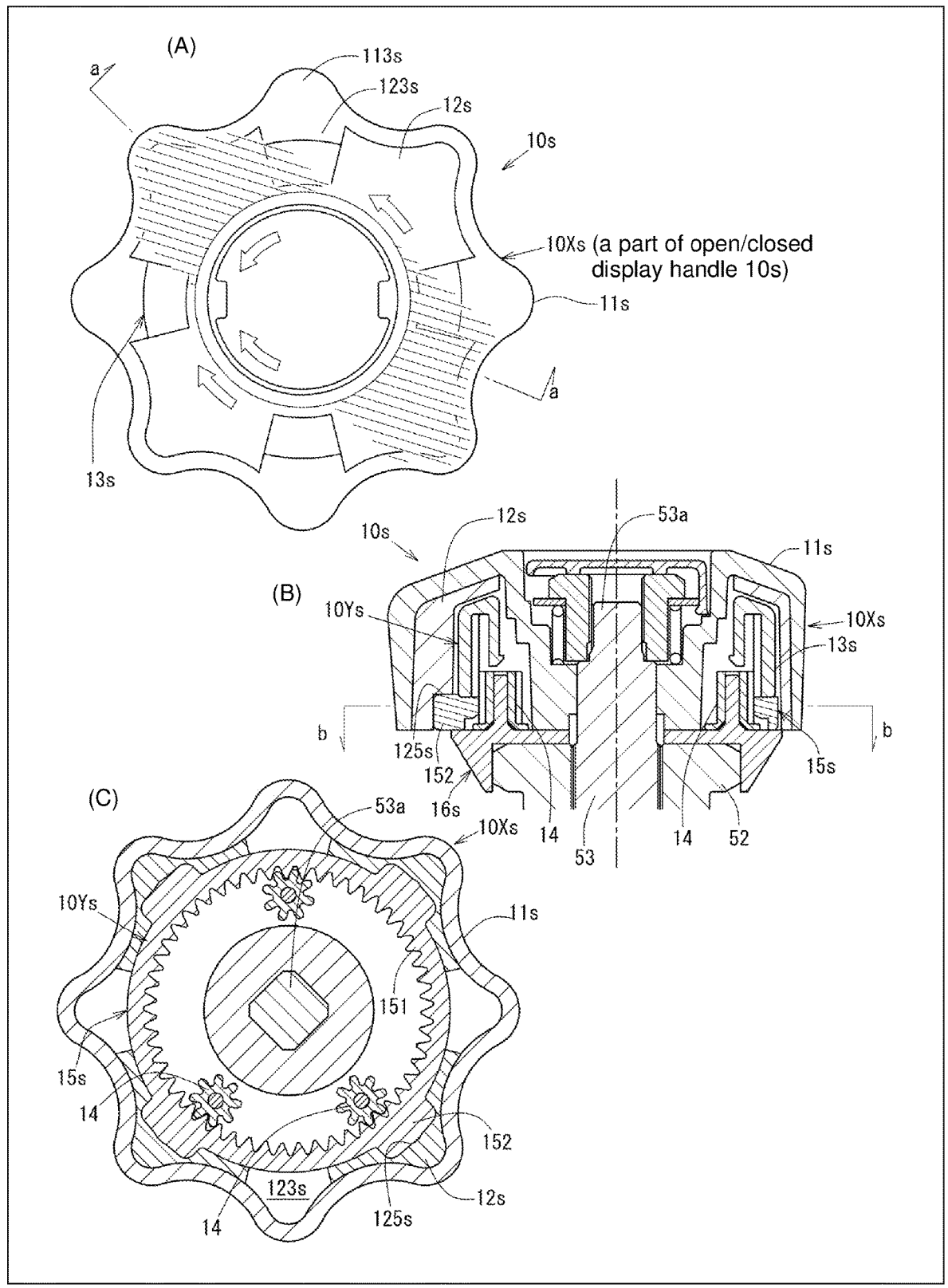
FIG. 9 is an explanatory diagram of an open/closed display handle of another embodiment.
Figure 10:
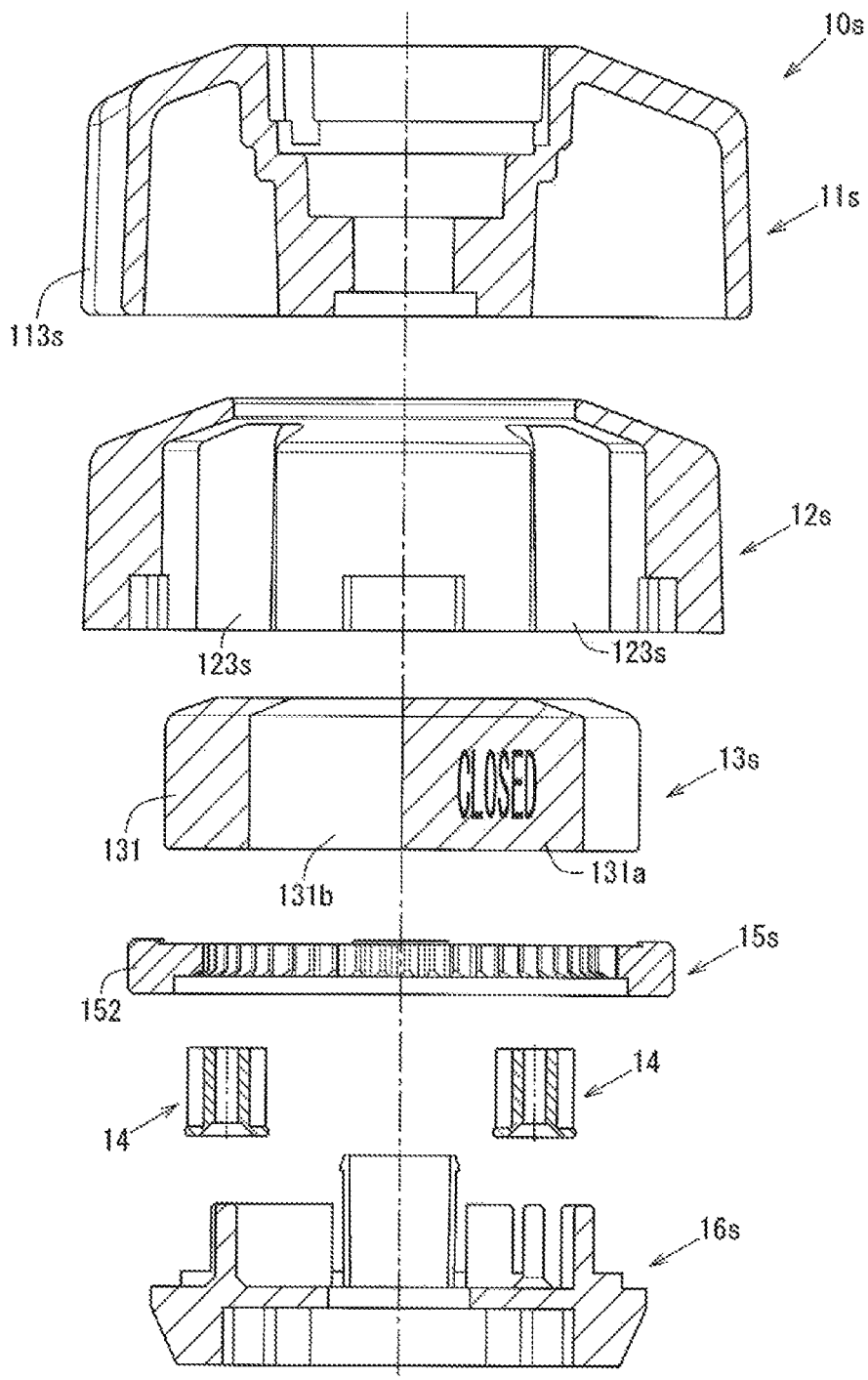
FIG. 10 is an exploded sectional view of an open/closed display handle of another embodiment.

Although the open/closed display handle 10 described above has a shape projecting in five directions in plan view, the open/closed display handle 10 may have a different shape like an open/closed display handle 10s according to another embodiment shown in FIGS. 9 and 10.

FIG. 9 shows an explanatory diagram of an open/closed display handle 10s according to another embodiment, and FIG. 10 shows an exploded sectional view of the open/closed display handle 10s according to another embodiment.

Specifically, FIG. 9(a) is a plan view of the open/closed display handle 10s, FIG. 9(b) is a sectional view taken along line a-a in FIG. 9(a), and FIG. 9(c) is a sectional view viewed along arrows b-b in FIG. 9(b).

The open/closed display handle 10s shown in FIGS. 9 and 10 is formed of a transparent cover body 11s, a visual recognition restricting body 12s, a rotary display body 13s, three planetary gears 14, an internal gear ring 15s and a rotary fixed body 16s. The planetary gears 14 are the same as the planetary gears 14 in the open/closed display handle 10 described above, and therefore its description is omitted.

Further, in the open/closed display handle 10s having the above-mentioned configuration, the transparent cover body 11s, the visual recognition restricting body 12s, and the internal gear ring 15s form a handle main body 10Xs that rotates the spindle 53 of the open/closed valve mechanism 50 of a valve device 1. At the same time, the display body-side gear 132 of the rotary display body 13s, the two planetary gears 14 pivotally supported by the rotary fixed body 16s, and the internal gear ring 15s form a differential rotation mechanism 10Ys.

The handle main body 10Xs formed of the transparent cover body 11s, the visual recognition restricting body 12s, and the internal gear ring 15s rotates the spindle 53 of the open/closed valve mechanism 50, includes the handle-side gear 151 of the internal gear ring 15s that rotates about the axis L, and has a shape in which a portion projecting radially outward and a portion recessing radially inward in plan view are alternately continuous in the circumferential direction so that a waveform projects in eight directions.

The transparent cover body 11s that constitutes an outer shape of the handle main body 10Xs as described above has a cylindrical shape that projects in eight directions as described above that covers an entire outer side of the visual recognition restricting body 12s described later and is entirely made of a transparent resin that is translucent to allow visual recognition from outer sides of openings 123s in the visual recognition restricting body 12s. Other configurations are similar to those of the transparent cover body 11 of the open/closed display handle 10.

Further, in the shape projecting in eight directions, portions in four directions corresponding to the openings 123s of the visual recognition restricting body 12s form window portions 113s.

The visual recognition restricting body 12s, which is arranged on an inner side of the transparent cover body 11s and covers the rotary display body 13s described later, has four openings 123s at equal intervals in a shape projecting in eight directions, which is slightly smaller than the transparent cover body 11s, and is made thinner than the transparent cover body 11s.

The openings 123s open over an upper surface and a side surface of the visual recognition restricting body 12s.

As shown in FIG. 9(c), on a bottom surface side of a projecting portion in which the openings 123s in the shape projecting in eight directions are not provided, fitting portions 125s that fit into the fitting projections 152 so as to rotate integrally with the fitting projections 152 of the internal gear ring 15s described later.

Other configurations of the visual recognition restricting body 12s are the same as those of the visual recognition restricting body 12 of the open/closed display handle 10 described above.

The rotary display body 13s has the same configuration as the rotary display body 13 of the open/closed display handle 10 described above, and four combinations of the closed display portion 131a and the open display portion 131b are provided in the circumferential direction. The excessive rotation display portion 131c and the open/closed degree display portion 133 may or may not be provided.

The planetary gears 14 have the same configuration as the planetary gears 14 of the open/closed display handle 10 described above, and three planetary gears 14 are provided in the open/closed display handle 10s.

The internal gear ring 15s has the same configuration as the internal gear ring 15 of the open/closed display handle 10 described above, and four fitting projections 152 are provided corresponding to the fitting portions 125s while five fitting projections 152 are provided in the internal gear ring 15 of the open/closed display handle 10.

Since the rotary fixed body 16s has the same configuration and function as the rotary fixed body 16 of the open/closed display handle 10, the description thereof will be omitted.

The open/closed display handle 10s thus configured is assembled in the same manner as the open/closed display handle 10 described above, and can achieve the same effect as the open/closed display handle 10. In other words, the open/closed display handle that rotates the open/closed valve mechanism 50 does not matter as to the shape or the number of projections to the radial outside as long as the open/closed valve mechanism 50 can be rotated, and may be provided on side surfaces that recess in the plan view direction such as the side surface window portions 113 of the open/closed display handle 10, or may be provided on projections such as the open/closed display handle 10s.

In the correspondence between the configuration of the present invention and the above-described embodiment, the valve device of the present invention corresponds to the valve device 1.

Similarly to the above, the open/closed valve corresponds to the open/closed valve mechanism 50, the valve rod corresponds to the spindle 53, the opening and closing handle corresponds to the open/closed display handle 10, 10s, the rotation center corresponds to the axis L, the handle-side gear corresponds to the handle-side gear 151, the handle main body corresponds to the handle main body 10X, 10Xs, the display portion corresponds to the open/closed display portion 131, the display body-side gear corresponds to the display body-side gear 132, the rotary display body corresponds to the rotary display body 13, 13s, the rotation gear corresponds to the planetary gear 14, the rotary fixed body corresponds to the rotary fixed body 16, 16s, the differential rotation mechanism corresponds to the differential rotation
mechanism 10Y, 10Ys, the opening correspond to the opening 123, 123s, the visual recognition restricting body corresponds to the visual recognition
restricting body 12, 12s, the translucent cover body corresponds to the transparent cover body 11, 11s, the open/closed degree display corresponds to the open/closed degree display portion 133, the open display portion corresponds to the open display portion 131b, the closed display portion corresponds to the closed display portion 131a, the excessive rotation display portion corresponds to the excessive rotation display portion 131c, the upper opening corresponds to the upper opening 123a, the side opening corresponds to the side opening 123b.

However, the present invention is not limited to the configurations of the above-described embodiments, and many embodiments can be obtained.

For example, in the above description, the valve device 1 is a container valve attached to a container such as a gas cylinder, but it may be a pipe valve attached to a pipe.

The open/closed display portion 131 that displays at least one of the open valve state and the closed valve state may be any one of an open/closed display with characters, an open/closed display with colors, an open/closed display with patterns, and an open/closed display with light and darkness, or a combination thereof.

Although the excessive rotation display portion 131c is provided in an excessive rotation region for the fully closed state or the fully open state, the excessive rotation display portion 131c may be provided over the excessive rotation region before the fully closed state or the fully open.

Further, the open/closed degree display portion 133 may display the open/closed degree by a bar displayed on the open/closed display portion 131 becoming longer or shorter as the valve state changes from the closed valve state to the open valve state, the number of marks gradually increasing or decreasing, a scale increasing or decreasing, or a figure displayed gradually increasing or decreasing.

REFERENCE SIGNS LIST 1 valve device
10, 10s open/closed display handle
10X, 10Xs handle main body
10Y, 10Ys differential rotation mechanism
11, 11s transparent cover body
12, 12s visual recognition restricting body
13, 13s rotary display body
14 planetary gear
16, 16s rotary fixed body
50 open/closed valve mechanism
53 spindle
123, 123s opening
123a upper opening
123b side opening
131 open/closed display portion
131a closed display portion
131b open display portion
131c excessive rotation display portion
132 display body-side gear
133 closed degree display
152 handle-side gear
L axis

The invention claimed is:

1. An opening and closing handle that rotates a valve rod of an open/closed valve of a valve device, the opening and closing handle comprising:
a handle main body that rotates the valve rod and has a handle-side gear that rotates about a rotation center of the valve rod;
a rotary display body that has a display portion that displays an open valve state or a closed valve state of the open/closed valve, and a display body-side gear that rotates about the rotation center of the valve rod; and
a rotary fixed body that is rotatably fixed to the valve device and pivotally supports a rotation gear,
wherein the handle-side gear includes a number of teeth different from a number of teeth of the display body-side gear,
the handle-side gear that meshes with the rotation gear, and
the display body-side gear that meshes with the rotation gear,
such that the rotation gear, the handle-side gear, and the display body-side gear co-operate with each other, to function as a differential rotation mechanism that differentially rotates the rotary display body with respect to the handle main body, wherein the handle main body is formed of:
a visual recognition restricting body that covers the rotary display body, has an opening that opens to allow a required portion of the display portion to be visually recognized from an outside and restricts visual recognition of a portion other than the required portion from the outside, and
a translucent cover body that covers an entire outer side of the visual recognition restricting body and is translucent to allow visual recognition from at least an outer side of the opening,
wherein the display portion includes a combination of an open display portion that displays the open valve state and a closed display portion that displays the closed valve state, and
wherein an excessive rotation display portion that displays an excessive rotation state is provided on at least one of a side opposite to an open valve direction of the open display portion and a side opposite to a closed valve direction of the closed display portion.

2. The opening and closing handle according to claim 1, wherein the entire translucent cover body allows an inside to be visually recognized from the outside.

3. The opening and closing handle according to claim 2, wherein the visual recognition restricting body is formed to be thinner than the translucent cover body.

4. The opening and closing handle according to claim 1, wherein
the display portion is provided with
an open/closed degree display that visually displays an open/closed degree by a visible length, number, amount, and figure.

5. The opening and closing handle according to claim 1, wherein
the display portion includes
a plurality of combinations of the open display portion and the closed display portion, and
a plurality of the openings in the visual recognition restricting body are provided in correspondence with the number of the combinations of the open display portion and the closed display portion.

6. The opening and closing handle according to claim 5, wherein
an excessive rotation display portion that displays an excessive rotation state is provided on at least one of a side opposite to an open valve direction of the open display portion and a side opposite to a closed valve direction of the closed display portion.

7. The opening and closing handle according to claim 1, wherein
the opening includes
an upper opening that opens upward in the handle main body and
a side opening that opens laterally in the handle main body.

8. The opening and closing handle according to claim 1, wherein the visual recognition restricting body is integrated with the handle-side gear.

9. A valve device including the opening and closing handle according to claim 1 that is mounted on the valve rod of the open/closed valve.

10. An opening and closing handle that rotates a valve rod of an open/closed valve of a valve device, the opening and closing handle comprising:
a handle main body that rotates the valve rod and has a handle-side gear that rotates about a rotation center of the valve rod;
a rotary display body that has a display portion that displays an open valve state or a closed valve state of the open/closed valve, and a display body-side gear that rotates about the rotation center of the valve rod; and
a rotary fixed body that is rotatably fixed to the valve device and pivotally supports a rotation gear, wherein the handle-side gear includes a number of teeth different from a number of teeth of the display body-side gear, the handle-side gear that meshes with the rotation gear, and the display body-side gear that meshes with the rotation gear, such that the rotation gear, the handle-side gear, and the display body-side gear co-operate with each other, to function as a differential rotation mechanism that differentially rotates the rotary display body with respect to the handle main body, wherein the handle main body is formed of:

a visual recognition restricting body that covers the rotary display body, has an opening that opens to allow a required portion of the display portion to be visually recognized from an outside and restricts visual recognition of a portion other than the required portion from the outside, and a translucent cover body that covers an entire outer side of the visual recognition restricting body and is translucent to allow visual recognition from at least an outer side of the opening, wherein the visual recognition restricting body is formed to be thinner than the translucent cover body.

11. The opening and closing handle according to claim 10, wherein the display portion includes a combination of an open display portion that displays the open valve state and a closed display portion that displays the closed valve state.

12. The opening and closing handle according to claim 11, wherein an excessive rotation display portion that displays an excessive rotation state is provided on at least one of a side opposite to an open valve direction of the open display portion and a side opposite to a closed valve direction of the closed display portion.

* * * * *